(12) United States Patent
Sakamoto

(10) Patent No.: US 7,700,061 B2
(45) Date of Patent: Apr. 20, 2010

(54) HEAT-RESISTANT MATERIAL FOR LOW-MELTING METAL CASTING MACHINE

(75) Inventor: Akifumi Sakamoto, Hamamatsu (JP)

(73) Assignee: Nichias Corporation, Tokyo (JP)

( * ) Notice: Subject to any disclaimer, the term of this patent is extended or adjusted under 35 U.S.C. 154(b) by 73 days.

(21) Appl. No.: 11/727,646

(22) Filed: Mar. 27, 2007

(65) Prior Publication Data

US 2007/0221013 A1   Sep. 27, 2007

(30) Foreign Application Priority Data

Mar. 27, 2006   (JP) .................... P.2006-086401

(51) Int. Cl.
- C04B 35/03   (2006.01)
- C04B 35/14   (2006.01)
- C04B 35/16   (2006.01)
- C01B 33/24   (2006.01)
- C01B 33/08   (2006.01)

(52) U.S. Cl. .................... 423/331; 501/94; 501/123; 501/133; 423/341

(58) Field of Classification Search .................... 501/94, 501/123, 133, 151; 423/325, 331, 341
See application file for complete search history.

(56) References Cited

U.S. PATENT DOCUMENTS

| | | | | |
|---|---|---|---|---|
| 3,966,884 A | * | 6/1976 | Jacob | 423/331 |
| 3,967,974 A | * | 7/1976 | Ohnemuller et al. | 106/470 |
| 5,033,721 A | * | 7/1991 | Gnyra | 266/280 |
| 6,458,732 B1 | * | 10/2002 | Doza et al. | 501/94 |

FOREIGN PATENT DOCUMENTS

| | | | |
|---|---|---|---|
| GB | 500901 | | 2/1939 |
| GB | 500901 A | * | 2/1939 |
| JP | 1577427 B | | 8/1990 |
| JP | 1638119 B | | 1/1992 |

OTHER PUBLICATIONS

Kirk-Othmer. Encyclopedia of Chemical Technology, 3$^{rd}$ Edition. vol. 5, 1979. Joh Wiley & Sons, USA, p. 163-171.*
Kirk-Othmer, "Encyclopedia of Chemical Technology", 3$^{rd}$ Edition, vol. 5, 1979, John Wiley & Sons, USA, XP002445557, pp. 163-171.

* cited by examiner

Primary Examiner—Karl E Group
Assistant Examiner—Noah S Wiese
(74) Attorney, Agent, or Firm—Nixon & Vanderhye P.C.

(57) ABSTRACT

The present invention provides a heat-resistant material for a low-melting metal casting machine, which comprises calcium silicate and a fluoride.

26 Claims, 1 Drawing Sheet

HEAT-RESISTANT MATERIAL FOR LOW-MELTING METAL CASTING MACHINE

FIELD OF THE INVENTION

The present invention relates to a heat-resistant material used in a casting machine for casting a relatively low-melting metal generally having a melting point of 800° C. or less, such as aluminum, magnesium, zinc, tin, lead or an alloy thereof, at a site in contact with a molten metal of the low-melting metal.

BACKGROUND OF THE INVENTION

In the casting machine, processed goods of various heat-resistant materials are used as lining materials for a teeming box, a trough and a retaining furnace for transferring, supplying and retaining the molten metal as described above, or as attached members such as a float, a spout, a hot-top ring and a transition plate. Above all, heat-resistant materials in which calcium silicate matter is reinforced with carbon fibers have been widely used because of good heat resistance, high strength although lightweight and further excellent processability (for example, see patent document 1 and patent document 2).

Patent Document 1: Japanese Patent No. 1577427

Patent Document 2: Japanese Patent No. 1638119

On the other hand, also in mobile equipment such as digital cameras, digital video cameras, mobile phones and notebook personal computers, or heavy loads such as automobiles, frames and case bodies tend to be formed by magnesium alloys for weight saving. However, magnesium or a magnesium-containing alloy is very high in activity, and extremely strong in the function of corroding a material that comes into contact with a molten metal thereof. Accordingly, conventional parts comprising calcium silicate matter or an alumina-silica-based material have the problem that only several uses, or only one use in some cases, force them to be exchanged.

In order to enhance corrosion resistance, it has been tried to apply heat-resistant coating materials. However, the existing heat-resistant coating materials are less effective in improving corrosion resistance against the molten metal of magnesium or the magnesium-containing alloy. Further, due to stress applied to a coated portion by the movement of the molten metal and the difference from a base material in the coefficient of thermal expansion, there has also been a problem that the coated portion is separated to entirely lose its effect.

SUMMARY OF THE INVENTION

The invention has been made taking such conventional problems into consideration, and an object thereof is to improve durability to a molten metal having strong corrosion properties, such as magnesium or a magnesium-containing alloy, while maintaining excellent heat insulating properties, specific strength and processability of calcium silicate matter in a heat-resistant material for a low-melting metal casting machine.

Other objects and effects of the invention will become apparent from the following description.

In order to achieve the above-mentioned object, the invention provides the following heat-resistant material for a low-melting metal casting machine:

(1) A heat-resistant material for a low-melting metal casting machine, which comprises calcium silicate and a fluoride;

(2) The heat-resistant material for a low-melting metal casting machine described in the above (1), wherein the fluoride is present in an amount of 0.05 to 30% by weight in terms of fluorine content;

(3) The heat-resistant material for a low-melting metal casting machine described in the above (1) or (2), wherein calcium silicate is at least one member selected from the group consisting of wollastonite ($CaSiO_3$), tobermolite ($5CaO.6SiO_2.5H_2O$) and xonotlite ($6CaO.6SiO_2.H_2O$);

(4) The heat-resistant material for a low-melting metal casting machine described in any one of the above (1) to (3), wherein the fluoride is at least one member selected from the group consisting of calcium fluoride ($CaF_2$), magnesium fluoride ($MgF_2$) and cryolite ($Na_3AlF_6$);

(5) The heat-resistant material for a low-melting metal casting machine described in any one of the above (1) to (4), wherein the heat-resistant material has a density of 200 to 2,500 $kg/m^3$ and a bending strength of 1 to 20 MPa; and (6) The heat-resistant material for a low-melting metal casting machine described in any one of the above (1) to (5), wherein the heat-resistant material is to be used at a site in contact with a molten metal of magnesium or a magnesium-containing alloy.

The "magnesium-containing alloy" as referred to in the invention means generally an alloy of magnesium and a low-melting metal other than magnesium, such as aluminum, zinc, tin or lead. Although the content of magnesium may be any, magnesium is contained realistically within the range of 0.1% by weight to 99.9% by weight based on the total amount of the alloy.

The heat-resistant material for a low-melting metal casting machine according to the invention has excellent heat insulating properties, specific strength and processability derived from calcium silicate, and corrosion resistance against a molten metal having high corrosion properties such as magnesium or a magnesium-containing alloy, which is very excellent compared to that of conventional materials, is imparted thereto. Accordingly, for example when it is used in a teeming box of a casting machine, the exchange frequency of parts is substantially decreased compared to the conventional art, and the cost of the material itself is also approximately equivalent to that of the conventional material. Accordingly, in the durable time and material cost, casting becomes possible totally at very low cost compared to the conventional art.

DETAILED DESCRIPTION OF THE INVENTION

Figure 1:
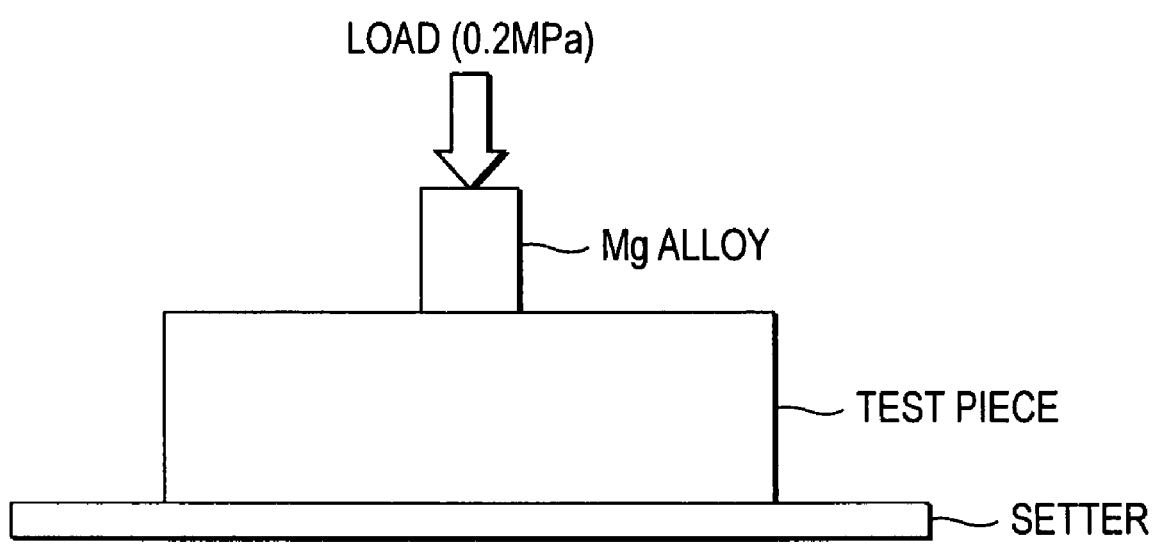
FIG. 1 is a schematic view for illustrating the test method of the corrosion test in Examples.

The invention will be described in detail below.

The heat-resistant material for a low-melting metal casting machine of the invention comprises calcium silicate as a parent material in order to secure heat insulating properties, specific strength and processability, and a fluoride is incorporated therein in order to impart corrosion resistance. The fluorine content in the heat-resistant material of the invention is preferably 0.05 to 30% by weight, more preferably 0.05 to 5% by weight, still further preferably 0.1 to 4.0% by weight, and particularly preferably 0.5 to 3.0% by weight.

Calcium silicate is not particularly limited, but at least one member selected from wollastonite ($CaSiO_3$), tobermolite ($5CaO.6SiO_2.5H_2O$) and xonotlite ($6CaO.6SiO_2.H_2O$) is preferred. Further, the content of calcium silicate in the heat-resistant material for a low-melting metal casting machine is not particularly limited so long as the fluorine content in the heat-resistant material fall within the above-described range, but it is preferably from 70 to 99.95% by weight, and more preferably from 85 to 99.9% by weight, still further preferably from 88 to 99.5% by weight, and particularly preferably from 92 to 99% by weight. When the content of calcium silicate is less than 70% by weight, heat insulating properties, specific strength and processability decrease. On the other hand, when the content of calcium silicate exceeds 99.95% by weight, the fluorine content is too small to obtain the effect of improving corrosion resistance.

The fluorides are not particularly limited, but include inorganic fluorides such as calcium fluoride ($CaF_2$), magnesium fluoride ($MgF_2$), cryolite ($Na_3AlF_6$), lithium fluoride (LiF), barium fluoride ($BaF_2$), aluminum fluoride ($AlF_3$), strontium fluoride ($SrF_2$), cerium fluoride ($CeF_3$), yttrium fluoride ($YF_3$), sodium fluoride (NaF), potassium fluoride (KF), sodium silicofluoride ($Na_2SiF_6$) and ammonium silicofluoride (($NH_4)_2SiF_6$). In the invention, at least one member selected from calcium fluoride ($CaF_2$), magnesium fluoride ($MgF_2$) and cryolite ($Na_3AlF_6$) is preferably used because of low cost. Further, in the invention, the fluoride is being dispersed in granular form in the heat-resistant material for a low-melting metal casting machine. Accordingly, the smaller particle size is better, although not particularly limited. The particle size is preferably from 3 to 15 μm, and more preferably from 5 to 10 μm. The heat-resistant material for a low-melting metal casting machine can be formed by two components of the fluoride and the above-mentioned calcium silicate, so that the content of the fluoride is not particularly limited so long as the fluorine content in the heat-resistant material fall within the above-described range, but it is preferably from 0.05 to 30% by weight, more preferably from 0.1 to 15% by weight, still further preferably from 0.5 to 12% by weight, and particularly preferably from 1 to 8% by weight. When the content of the fluoride is less than 0.05% by weight, corrosion resistance can not be improved. Exceeding 30% by weight results in decreases in heat insulating properties, specific strength and processability of the heat-resistant material for a low-melting metal casting machine.

Although the heat-resistant material for a low-melting metal casting machine of the invention can be formed by calcium silicate and the fluoride as described above, known materials that have hitherto been incorporated into heat-resistant materials may also be added, as needed. Above all, addition of reinforcing fibers is preferred, and glass fibers, carbon fibers, ceramic fibers or the like can be added in an amount of 0.1 to 3% by weight. It is preferred that these reinforcing fibers have a fiber diameter of 3 to 15 μm and a fiber length of 3 to 10 mm because of their excellent reinforcing effect.

In order to produce the heat-resistant material for a low-melting metal casting machine of the invention, known production methods can be used. For example, a sheet making method or a dehydrating press method may be used. Specifically, an aqueous slurry containing a raw material for calcium silicate and the fluoride is subjected to dehydration molding to form, for example, a tabular dehydrated molded product, and the dehydrated molded product is subjected to hydrothermal treatment to generate calcium silicate. The raw material for calcium silicate is a mixture of a lime raw material and a silicic acid raw material, and constituted by lime, xonotlite, wollastonite, quartzite and the like. Further, an antifoaming agent or a flocculating agent is preferably added to the aqueous slurry, and each can be added in an amount of 0.01 to 0.3% by weight in terms of solid matter. It is preferred that the antifoaming agent does not remain in the resulting heat-resistant material for a low-melting metal casting machine. Accordingly, it is preferred that a water-soluble antifoaming agent is used and discharged together with water at the time of dehydration molding.

In the dehydration molding, molding conditions are adjusted so that the resulting heat-resistant material for a low-melting metal casting machine has a density of 200 to 2,500 kg/$m^3$, more preferably 700 to 1,000 kg/$m^3$, and a bending strength of 1 to 20 MPa, more preferably 6 to 12 MPa. When the heat-resistant material for a low-melting metal casting machine has such a density and a bending strength, it becomes excellent and well balanced in heat insulating properties, specific strength, processability and corrosion resistance.

The hydrothermal treatment requires only to place the dehydrated molded product in an autoclave and to heat it under a steam atmosphere. It is necessary to conduct this hydrothermal treatment until the synthesis of calcium silicate has been completed, and conditions thereof are appropriately set depending on the composition of the raw material for calcium silicate, the size of the dehydrated molded product and the kind of calcium silicate to be formed. However, it is suitable to conduct the treatment at a steam pressure of 0.9 to 1.8 MPa for a treating time of 2 to 20 hours.

After the hydrothermal treatment, the resulting product is dried to obtain a heat-resistant material for a low-melting metal casting machine, which can be used as it is. However, the crystal form of calcium silicate in this state is a mixed form of wollastonite and xonotlite. For the purpose of dehydrating crystal water of xonotlite in order to more enhance corrosion resistance, burning is preferably conducted. There is no limitation on the burning, as long as crystal water can be dehydrated. For example, it is proper to conduct the burning in a nitrogen atmosphere at 600 to 800° C. for 2 to 5 hours. As for the crystal form of calcium silicate after the burning, wollastonite becomes the main component, because xonotlite has been dehydrated.

The heat-resistant material for a low-melting metal casting machine of the invention is excellent in processability, derived from calcium silicate, and can be easily processed to a desired shape by cutting or the like. Further, excellent corrosion resistance is imparted by the fluoride, so that the heat-resistant material of the invention is most suitably used particularly at a site in contact with a molten metal of magnesium or a magnesium-containing alloy. Accordingly, the heat-resistant material of the invention is suitable as a lining materials for a teeming box, a trough and a retaining furnace of a machine for casting magnesium or a magnesium-containing alloy, or as attached members such as a float, a spout, a hot-top ring and a transition plate.

EXAMPLES

The present invention will be illustrated in greater detail with reference to the following examples and comparative examples, but the invention should not be construed as being limited thereto.

Examples 1 to 14 and Comparative Examples 1 to 6

According to the formulations shown in Tables 1 to 3, below raw materials for calcium silicate, fluorides and other materials were mixed and stirred to prepare aqueous slurries. Details of the ingredients are as follow:

| | | |
|---|---|---|
| Lime | Average particle size: 2 μm, CaO Purity: 99.2% | |
| Quartzite | Average particle size: 6 μm, SiO$_2$ Purity: 98.4% | |
| Wollastonite | "NYAD-G" manufactured by NYCO Minerals | |
| Calcium Fluoride | Reagent (fluorine content: 48% by weight) manufactured by Wako Pure Chemical Industries, Ltd. | |
| Magnesium Fluoride | Reagent (fluorine content: 60% by weight) manufactured by Wako Pure Chemical Industries, Ltd. | |
| Boron Nitride | Average particle size: 10 μm, BN Purity: 98.6% | |
| Silicon Carbide | Average particle size: 8 μm, SiC Purity: 99.2% | |
| Reinforcing Fiber | Carbon fiber (PAN, fiber length: 6 mm, fiber diameter: 7 μm) | |
| Flocculating Agent | Polyacrylamide | |

Then, the aqueous slurries were subjected to dehydration molding by a press to form tabular dehydrated molded products, and thereafter, the products were placed in an autoclave and subjected to hydrothermal treatment under conditions of 1.7 MPa for 8 hours. Then, the resulting products were dried at 105° C. for 24 hours, and further, burned in a nitrogen atmosphere at 750° C. for 3 hours to obtain tabular test specimens having a thickness of 25 mm.

For each test specimen, the density was measured, and further, measurements of the three-point bending strength and the coefficient of thermal expansion and a corrosion test were made according to the following methods. The results of the measurements and the results of the test are shown in Tables 1 to 4.

<Measurement of Three-Point Bending Strength>

For a test piece 300 mm long, 75 mm wide and 25 mm thick cut out from the test specimen, the tree-point bending strength was measured at a distance between fulcrums of 200 mm and a loading rate of 10 mm/min using an autograph "AG-50kNG" manufactured by Shimadzu Corporation.

<Measurement of Coefficient of Thermal Expansion>

For a test piece 20 mm long, 5 mm wide and 5 mm thick cut out from the test specimen, the coefficient of thermal expansion was measured while elevating the temperature from room temperature to 800° C. at a rate of 5° C./min in the air, using a thermomechanical measuring apparatus "TMA8310" manufactured by Rigaku Denki Kogyo Co., Ltd.

<Corrosion Test>

A test piece having a rectangular shape with a side of about 70 mm and a thickness of 25 mm was cut out from the test specimen. As schematically shown in FIG. 1, a column 8 mm in diameter and 10 mm high composed of a magnesium alloy (AZ31) was placed on an almost center portion of the test piece arranged on a setter, and a load of 2 MPa was applied onto an upper surface of the column. In this state, the temperature was elevated from room temperature to 800° C., taking 2 hours, in an argon atmosphere, thereby melting the magnesium alloy. Thereafter, the test piece was maintained at 800° C. for 1 hour in the argon atmosphere in a state where the same load was applied onto a liquid surface of a melt of the magnesium alloy, thereby keeping the state of contact of the melt of the test piece with the magnesium alloy. After a lapse of 1 hour, the pressure was released, and the melt of the magnesium alloy was recovered from a surface of the test piece. After the test piece was cooled to room temperature, the cross section of the test piece was observed, and the area of a portion where corroded by contact with the melt of the magnesium alloy was measured. The area practically not posing a particular problem was rated as "A", the area somewhat posing a problem but practically not posing a problem was rated as "B", and the area practically posing a problem was rated as "C". The results thereof are shown in Tables 1 to 4.

TABLE 1

| | | Comparative Example 1 | Example 1 | Example 2 | Example 3 | Example 4 |
|---|---|---|---|---|---|---|
| Formulation (Parts by weight) | Lime | 25.0 | 23.1 | 21.9 | 23.1 | 21.9 |
| | Quartzite | 25.0 | 23.7 | 22.4 | 23.7 | 22.4 |
| | Wollastonite | 34.0 | 33.2 | 31.4 | 33.2 | 31.4 |
| | Xonotlite Slurry (solid content)*1 | 13.0 | 12.5 | 11.9 | 12.5 | 11.9 |
| | Calcium Fluoride | | 5.0 | 10.0 | | |
| | Magnesium Fluoride | | | | 5.0 | 10.0 |
| | Boron Nitride | | | | | |
| | Silicon Carbide | | | | | |
| | Reinforcing Fiber | 1.8 | 1.8 | 1.8 | 1.8 | 1.8 |
| | Flocculating Agent (solid content) | 0.07 | 0.07 | 0.07 | 0.07 | 0.07 |
| | Water | 800.0 | 800.0 | 800.0 | 800.0 | 800.0 |
| | Autoclave | 1.7 MPa × 8 h | 1.7 MPa × 8 h | 1.7 MPa × 8 h | 1.7 MPa × 8 h | 1.7 MPa × 8 h |
| | Burning | 750° C. × 3 h N$_2$ | 750° C. × 3 h N$_2$ | 750° C. × 3 h N$_2$ | 750° C. × 3 h N$_2$ | 750° C. × 3 h N$_2$ |
| Physical Properties | Density [kg/m$^3$] | 800 | 782 | 765 | 805 | 772 |
| | Bending Strength [MPa] | 9.3 | 5.3 | 3.9 | 5.1 | 3.7 |
| | Coefficient of Thermal Expansion [$10^{-6}$/° C.] | 6.5 | 6.9 | 7.3 | 6.8 | 7.1 |
| Corrosion Test | Corroded Area [mm$^2$] | 113.7 | 0.0 | 0.0 | 0.0 | 0.0 |
| | Evaluation | C | A | A | A | A |
| Formulation (% by weight) | Calcium Silicate | 98.1 | 93.1 | 88.1 | 93.1 | 88.1 |
| | Fluoride (fluorine content) | 0.0 (0.0) | 5.0 (2.4) | 10.1 (4.8) | 5.0 (3.0) | 10.1 (6.0) |
| | Reinforcing Fiber | 1.8 | 1.8 | 1.8 | 1.8 | 1.8 |

*1 A xonotlite slurry previously prepared using an autoclave

TABLE 2

|  |  | Example 5 | Example 6 | Example 7 | Example 8 |
|---|---|---|---|---|---|
| Formulation (Parts by weight) | Lime | 27.8 | 27.8 | 27.8 | 27.8 |
|  | Quartzite | 30.4 | 30.4 | 30.4 | 30.4 |
|  | Wollastonite | 23.7 | 23.7 | 24.7 | 24.7 |
|  | Xonotlite Slurry (solid content)*1 | 13.3 | 13.3 | 13.3 | 13.3 |
|  | Calcium Fluoride | 2.0 |  | 1.0 |  |
|  | Magnesium Fluoride |  | 2.0 |  | 1.0 |
|  | Boron Nitride |  |  |  |  |
|  | Silicon Carbide |  |  |  |  |
|  | Reinforcing Fiber | 1.8 | 1.8 | 1.8 | 1.8 |
|  | Flocculating Agent (solid content) | 0.07 | 0.07 | 0.07 | 0.07 |
|  | Water | 800.0 | 800.0 | 800.0 | 800.0 |
|  | Autoclave | 1.7 MPa × 8 h | 1.7 MPa × 8 h | 1.7 MPa × 8 h | 1.7 MPa × 8 h |
|  | Burning | 750° C. × 3 h $N_2$ | 750° C. × 3 h $N_2$ | 750° C. × 3 h $N_2$ | 750° C. × 3 h $N_2$ |
| Physical Properties | Density [kg/m$^3$] | 833 | 840 | 852 | 844 |
|  | Bending Strength [MPa] | 8.5 | 9.2 | 9.1 | 8.9 |
|  | Coefficient of Thermal Expansion [$10^{-6}$/° C.] | 6.8 | 6.7 | 6.7 | 6.7 |
| Corrosion Test | Corroded Area [mm$^2$] | 0.0 | 0.0 | 13.2 | 5.6 |
|  | Evaluation | A | A | B | B |
| Formulation (% by weight) | Calcium Silicate | 96.1 | 96.1 | 97.1 | 97.1 |
|  | Fluoride (fluorine content) | 2.0 (1.0) | 2.0 (1.2) | 1.0 (0.5) | 1.0 (0.6) |
|  | Reinforcing Fiber | 1.8 | 1.8 | 1.8 | 1.8 |

*1 A xonotlite slurry previously prepared using an autoclave

TABLE 3

|  |  | Comparative Example 2 | Comparative Example 3 | Comparative Example 4 | Comparative Example 5 |
|---|---|---|---|---|---|
| Formulation (Parts by weight) | Lime | 23.1 | 21.9 | 23.1 | 21.9 |
|  | Quartzite | 23.7 | 22.4 | 23.7 | 22.4 |
|  | Wollastonite | 33.2 | 31.4 | 33.2 | 31.4 |
|  | Xonotlite Slurry (solid content)*1 | 12.5 | 11.9 | 12.5 | 11.9 |
|  | Calcium Fluoride |  |  |  |  |
|  | Magnesium Fluoride |  |  |  |  |
|  | Boron Nitride | 5.0 | 10.0 |  |  |
|  | Silicon Carbide |  |  | 5.0 | 10.0 |
|  | Reinforcing Fiber | 1.8 | 1.8 | 1.8 | 1.8 |
|  | Flocculating Agent (solid content) | 0.07 | 0.07 | 0.07 | 0.07 |
|  | Water | 800.0 | 800.0 | 800.0 | 800.0 |
|  | Autoclave | 1.7 MPa × 8 h | 1.7 MPa × 8 h | 1.7 MPa × 8 h | 1.7 MPa × 8 h |
|  | Burning | 750° C. × 3 h $N_2$ | 750° C. × 3 h $N_2$ | 750° C. × 3 h $N_2$ | 750° C. × 3 h $N_2$ |
| Physical Properties | Density [kg/m$^3$] | 793 | 802 | 826 | 855 |
|  | Bending Strength [MPa] | 3.2 | 2.4 | 5.5 | 4.1 |
|  | Coefficient of Thermal Expansion [$10^{-6}$/° C.] | 6.6 | 6.5 | 6.7 | 6.7 |
| Corrosion Test | Corroded Area [mm$^2$] | 82.5 | 23.3 | 120.2 | 112.9 |
|  | Evaluation | C | B | C | C |
| Formulation (% by weight) | Calcium Silicate | 93.1 | 88.1 | 93.1 | 88.1 |
|  | Boron Nitride | 5.0 | 10.1 |  |  |
|  | Silicon Carbide |  |  | 5.0 | 10.1 |
|  | Reinforcing Fiber | 1.8 | 1.8 | 1.8 | 1.8 |

*1 A xonotlite slurry previously prepared using an autoclave

TABLE 4

|  |  | Comparative Example 6 | Example 9 | Example 10 | Example 11 | Example 12 | Example 13 | Example 14 |
|---|---|---|---|---|---|---|---|---|
| Formulation (Parts by weight) | Lime | 25 | 27.8 | 27.8 | 27.8 | 21.9 | 27.8 | 27.8 |
|  | Quartzite | 25 | 30.4 | 30.4 | 30.4 | 22.4 | 30.4 | 30.4 |
|  | Wollastonite | 34 | 23.7 | 23.7 | 23.7 | 31.4 | 23.7 | 23.7 |
|  | Xonotlite Slurry (solid content)*1 | 13 | 13.3 | 13.3 | 13.3 | 11.9 | 13.3 | 13.3 |
|  | Calcium Fluoride |  | 0.2 | 0.5 |  | 24 | 2.0 |  |
|  | Magnesium Fluoride |  |  |  | 0.5 |  |  | 2.0 |
|  | Boron Nitride |  |  |  |  |  |  |  |
|  | Silicon Carbide |  |  |  |  |  |  |  |

TABLE 4-continued

|  |  | Comparative Example 6 | Example 9 | Example 10 | Example 11 | Example 12 | Example 13 | Example 14 |
|---|---|---|---|---|---|---|---|---|
|  | Reinforcing Fiber |  | 1.8 | 1.8 | 1.8 | 1.8 |  |  |
|  | Flocculating Agent (solid content) | 0.07 | 0.07 | 0.07 | 0.07 | 0.07 | 0.07 | 0.07 |
|  | Water | 800.0 | 800.0 | 800.0 | 800.0 | 800.0 | 800.0 | 800.0 |
|  | Autoclave | 1.7 MPa × 8 h | 1.7 MPa × 8 h | 1.7 MPa × 8 h | 1.7 MPa × 8 h | 1.7 MPa × 8 h | 1.7 MPa × 8 h | 1.7 MPa × 8 h |
|  | Burning | 750° C. × 3 h $N_2$ | 750° C. × 3 h $N_2$ | 750° C. × 3 h $N_2$ | 750° C. × 3 h $N_2$ | 750° C. × 3 h $N_2$ | 750° C. × 3 h $N_2$ | 750° C. × 3 h $N_2$ |
| Physical Properties | Density [kg/m³] | 800 | 852 | 845 | 839 | 789 | 849 | 831 |
|  | Bending Strength [MPa] | 8.5 | 9.1 | 9.4 | 9.7 | 2.5 | 7.7 | 8.1 |
|  | Coefficient of Thermal Expansion [$10^{-6}$/° C.] | 6.5 | 6.7 | 6.7 | 6.7 | 8.6 | 6.8 | 6.7 |
| Corrosion Test | Corroded Area [mm²] | 118.2 | 13.2 | 19.2 | 8.8 | 0.0 | 0.0 | 0.0 |
|  | Evaluation | C | B | B | B | A | A | A |
| Formulation (% by weight) | Calcium Silicate | 99.9 | 97.9 | 97.6 | 97.6 | 77.2 | 97.9 | 97.9 |
|  | Fluoride (fluorine content) | 0.0 (0.0) | 0.2 (0.1) | 0.5 (0.2) | 0.5 (0.3) | 21.2 (10.2) | 2.1 (1.0) | 2.1 (1.2) |
|  | Reinforcing Fiber | 0.0 | 1.9 | 1.8 | 1.8 | 1.6 | 0.0 | 0.0 |

*1A xonotlite slurry previously prepared using an autoclave

The respective sample specimens of Examples 1 to 8 are substantially improved in corrosion resistance compared to the sample specimen of Comparative Example 1 containing no fluoride. Further, they are also remarkably improved in corrosion resistance compared to the sample specimens of Comparative Examples 2 to 5 containing boron nitride or silicon carbide that has been said to be excellent in corrosion resistance against molten metals. Furthermore, in the sample specimens of Comparative Examples 2 to 5, the decreasing rate of bending strength is also high. In contrast, in the respective sample specimens of Examples 1 to 8, a decrease in bending strength is also inhibited.

While the present invention has been described in detail and with reference to specific embodiments thereof, it will be apparent to one skilled in the art that various changes and modifications can be made therein without departing from the spirit and scope thereof.

This application is based on Japanese patent application No. 2006-086401 filed Mar. 27, 2006, and the contents thereof are herein incorporated by reference.

What is claimed is:

1. A heat-resistant material for a low-melting metal casting machine, which comprises
   88 to 99.95% by weight calcium silicate comprising at least one member selected from the group consisting of wollastonite ($CaSiO_3$), tobermolite ($5CaO.6SiO_2.5H_2O$) and xonotlite ($6CaO.6SiO_2.H_2O$) and
   of a fluoride which is at least one member selected from the group consisting of calcium fluoride ($CaF_2$), magnesium fluoride ($MgF_2$) and cryolite ($Na_3AlF_6$), the fluorine content of the composition is 0.1 to 4.0% by weight,
   wherein the heat-resistant material has a density of 200 to 2,500 kg/m³ and a bending strength of 1 to 20 MPa and wherein the material is produced by hydrothermal treatment to generate the calcium silicate.

2. The heat resistant material according to claim 1, wherein the fluoride has a particle size of 3 to 15 μm.

3. The heat resistant material according to claim 2, wherein the heat-resistant material further comprises a reinforcing fiber in an amount of 0.1 to 3% by weight.

4. The heat resistant material according to claim 3, having a density from 700 to 1,000 kg/m³ and a bending strength of from 6 to 12 MPa.

5. The heat-resistant material according to claim 4, wherein the reinforcing fiber is carbon fiber and the heat-resistant material is produced by a process comprising a step of burning in a nitrogen atmosphere.

6. The heat-resistant material according to claim 2, wherein the heat-resistant material is to be used at a site in contact with a molten metal of magnesium or a magnesium-containing alloy.

7. The heat-resistant material according to claim 3, wherein the heat-resistant material is to be used at a site in contact with a molten metal of magnesium or a magnesium-containing alloy.

8. The heat-resistant material according to claim 4, wherein the heat-resistant material is to be used at a site in contact with a molten metal of magnesium or a magnesium-containing alloy.

9. The heat-resistant material according to claim 5, wherein the heat-resistant material is to be used at a site in contact with a molten metal of magnesium or a magnesium-containing alloy.

10. The heat resistant material according to claim 1, wherein the amount of calcium silicate is 92-99% by weight and the fluoride content is 1 to 8% by weight.

11. The heat resistant material according to claim 1, wherein the fluorine content is 0.5 to 3.0% by weight.

12. A heat-resistant material for a low-melting metal casting machine, which comprises
    92 to 99% by weight calcium silicate comprising at least one member selected from the group consisting of wollastonite ($CaSiO_3$), tobermolite ($5CaO.6SiO_2.5H_2O$) and xonotlite ($6CaO.6SiO_2.H_2O$) and
    a fluoride having a particle size of 3 to 15 μm which is at least one member selected from the group consisting of calcium fluoride ($CaF_2$), magnesium fluoride ($MgF_2$) and cryolite ($Na_3AlF_6$), the fluorine content of the composition is 0.1 to 4.0% by weight,
    wherein the heat-resistant material has a density of 200 to 2,500 kg/m³ and a bending strength of 1 to 20 MPa and wherein the material is produced by hydrothermal treatment to generate the calcium silicate.

13. The heat resistant material according to claim 12, wherein the heat-resistant material further comprises a reinforcing fiber in an amount of 0.1 to 3% by weight.

14. The heat resistant material according to claim 13, having a density from 700 to 1,000 kg/m³ and a bending strength of from 6 to 12 MPa.

15. The heat resistant material according to claim 14, wherein the reinforcing fiber is carbon fiber and the heat-resistant material is produced by a process comprising a step of burning in a nitrogen atmosphere.

16. The heat resistant material according to claim 12, wherein the heat-resistant material is to be used at a site in contact with a molten metal of magnesium or a magnesium-containing alloy.

17. The heat resistant material according to claim 13, wherein the heat-resistant material is to be used at a site in contact with a molten metal of magnesium or a magnesium-containing alloy.

18. The heat resistant material according to claim 14, wherein the heat-resistant material is to be used at a site in contact with a molten metal of magnesium or a magnesium-containing alloy.

19. The heat resistant material according to claim 15, wherein the heat-resistant material is to be used at a site in contact with a molten metal of magnesium or a magnesium-containing alloy.

20. The heat resistant material according to claim 13, wherein the fluorine content is 0.5 to 3.0% by weight.

21. The heat resistant material according to claim 12, wherein the heat-resistant material further comprises a reinforcing fiber in an amount of 0.1 to 3% by weight.

22. The heat resistant material according to claim 21, having a density from 700 to 1,000 kg/m³ and a bending strength of from 6 to 12 MPa.

23. The heat resistant material according to claim 22, wherein the reinforcing fiber is carbon fiber and the heat-resistant material is produced by a process comprising a step of burning in a nitrogen atmosphere.

24. The heat resistant material according to claim 21, wherein the heat-resistant material is to be used at a site in contact with a molten metal of magnesium or a magnesium-containing alloy.

25. The heat resistant material according to claim 22, wherein the heat-resistant material is to be used at a site in contact with a molten metal of magnesium or a magnesium-containing alloy.

26. The heat resistant material according to claim 23, wherein the heat-resistant material is to be used at a site in contact with a molten metal of magnesium or a magnesium-containing alloy.

* * * * *